Jan. 26, 1971 H. A. WILSON 3,557,483
FISHING ROD WITH REEL HANDLE SECTION
Filed Dec. 4, 1968 3 Sheets-Sheet 1
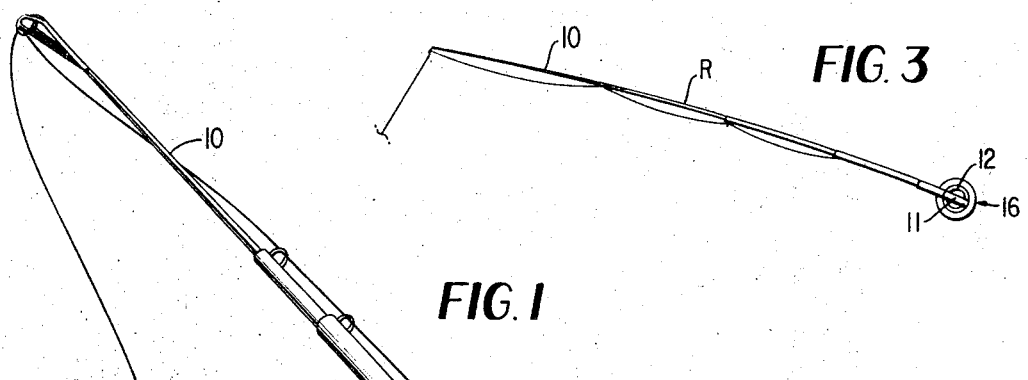
FIG. 3
FIG. 1
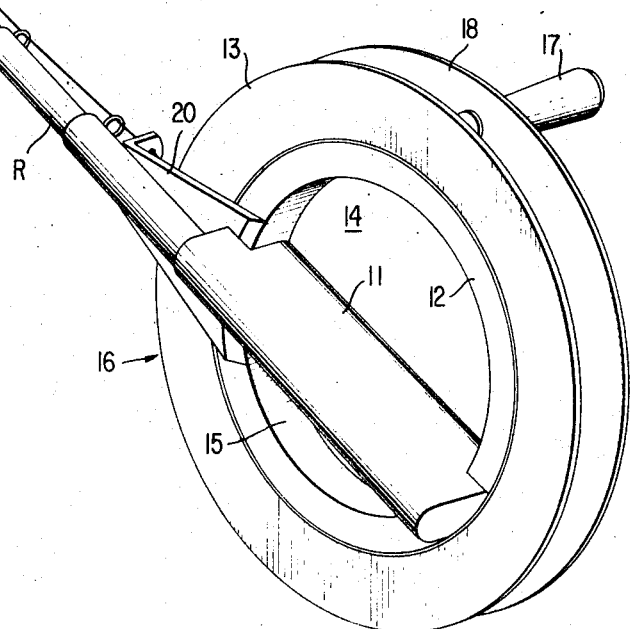
FIG. 2
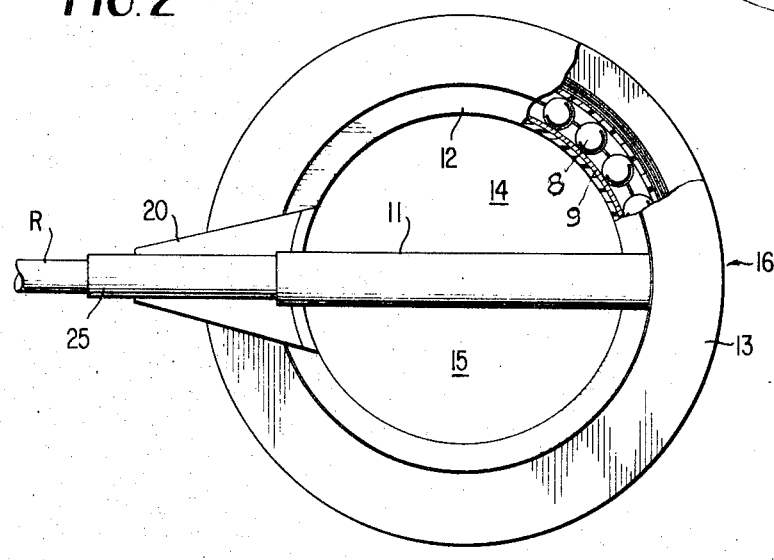
INVENTOR
HENRY ALLEN WILSON
BY
ATTORNEY Jan. 26, 1971 H. A. WILSON 3,557,483
FISHING ROD WITH REEL HANDLE SECTION
Filed Dec. 4, 1968 3 Sheets-Sheet 2

INVENTOR
HENRY ALLEN WILSON
BY
ATTORNEY

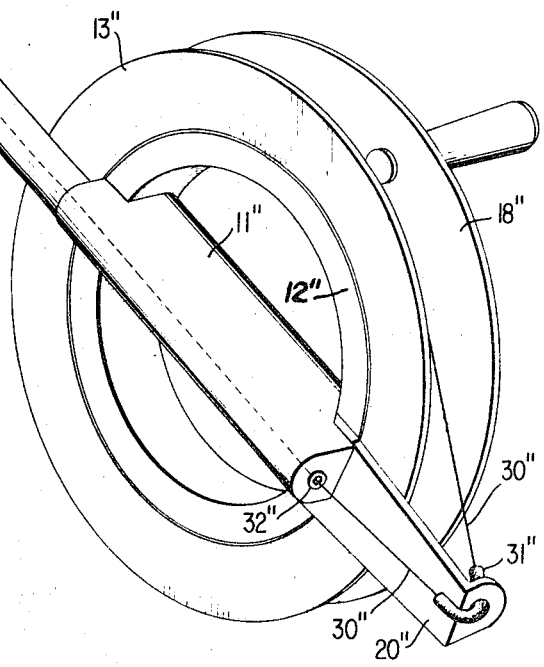

United States Patent Office 3,557,483
Patented Jan. 26, 1971

3,557,483
FISHING ROD WITH REEL HANDLE SECTION
Henry Allen Wilson, 16801 Collins Ave.,
Miami Beach, Fla. 33160
Filed Dec. 4, 1968, Ser. No. 780,973
Int. Cl. A01k 87/06, 89/00
U.S. Cl. 43—20                           4 Claims

ABSTRACT OF THE DISCLOSURE

A fishing rod and reel combination device in which the handle of the rod extends centrally of and fixedly along a diameter of the reel to also form the supporting handle around which the spool of the reel must turn when holding the rod during fishing, i.e., the rod is handled and manipulated entirely from a hand-held position at the center of the reel.

DISCLOSURE OF THE INVENTION

This invention relates to a rod having a reel made integral with the handle thereof.

It is an object of this invention to concentrate and center the major weight and control of the rod and reel around the casting and supporting hand of the fisherman.

A further object of my invention is to prevent the tendency of a rod having a reel section to turn about the axis of the rod on winding operations of the reel with one hand while holding and supporting the rod from its handle with the other hand.

A still further object of my invention is to improve handling of a rod during fishing maneuvers by disposing the handle of the rod on a diameter of the reel whereby the handle of the rod will also function as the handle of the reel.

These and other objects and advantages may suggest themselves to those skilled in the art; attention is therefore directed to the accompanying drawings wherein:

FIG. 1 is a perspective view of my fishing rod having a reel combined therewith, the rod having a handle at its inner end which also forms and provides the fixed handle of the reel;

FIG. 2 is a side view thereof with a portion of the reel broken away to show the antifriction mounting interior thereof;

FIG. 3 is a side view of a fishing rod having the reel handle section of this invention in position for casting;

FIG. 7 is a view similar to FIG. 1 but showing a further modified form of the invention.

Figure 5:
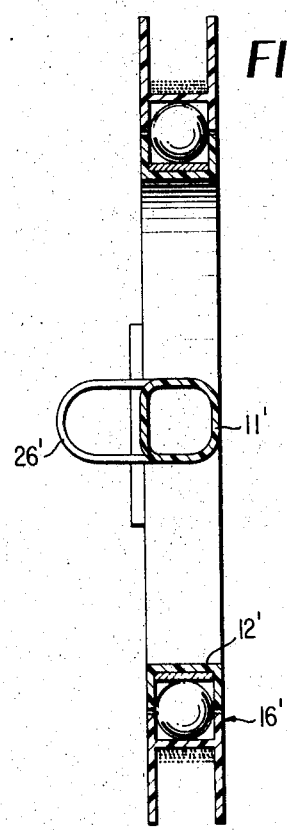
FIG. 5 is a vertical section taken on line 5—5 of FIG. 4.

Referring now particularly to sheet one of these drawings, I have shown in the primary form of my invention in FIG. 1 that the rear end handle portion of the fishing rod 10 is laterally thickened, as at 11 to also provide the fixed handle of the annular part 12 of the line reel of the rod 10. The line reel also comprises an outer spool portion 13, which as shown in FIG. 2 is rotatably carried on the fixed annular handle part 12, which part 12 forms a ring around the opposite ends of the handle 11 to which it is affixed in any desired manner so as to act as a functionally integral part thereof. Two semicircular spaces are thus provided, one above and the other below the fixed central handle 11, the upper space being designated 14 and the lower space 15, through which spaces 14 and 15 the thumb and fingers of the fisherman's left hand extend when grasping the combined handle 11 of the rod 10 and reel 16, whereby the spool 13 of the reel 16 will revolve about the hand-held handle of the rod and reel when being rotated by the crank 17. The crank 17 is preferably affixed to the outer flange 18 of the line-carrying spool 13 and is thus always in correct position for reeling in or otherwise, as the case may be, by the right hand while steadily supporting the rod from the unitary handle grip 11 at the center of the reel 16.

Figure 6:
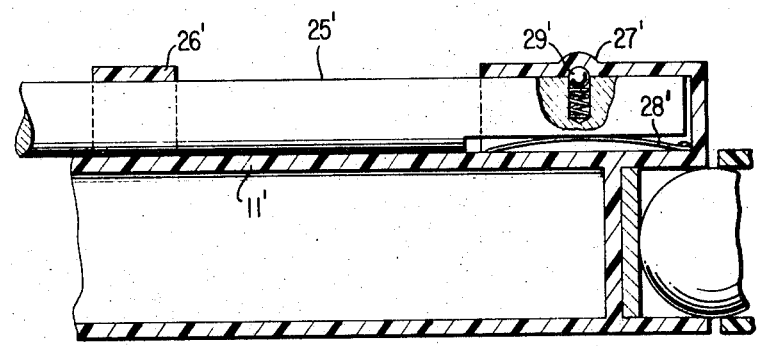
FIG. 6 is a detailed sectional view of the device of FIG. 4 taken through the fixed handle of the reel having parts thereon for receiving and fixedly attaching the handle of the fishing rod thereto as a fixed part thereof.
Figure 4:
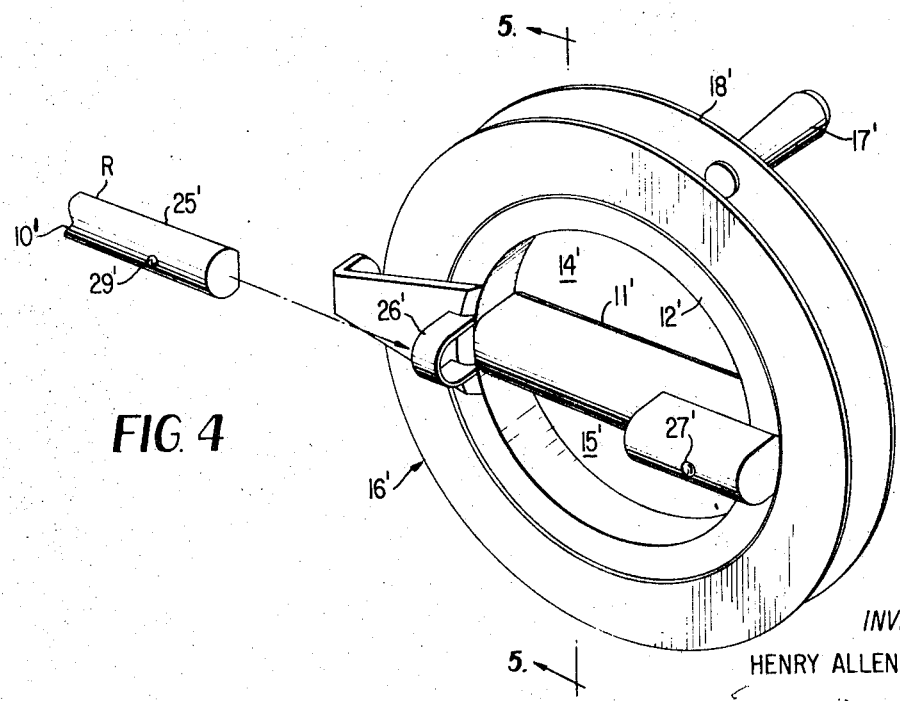
FIG. 4 is a view similar to FIG. 1 but showing a modified form of the invention.

While it is preferred to integrally construct the rod and reel combination as shown in FIGS. 1 and 2, an acceptable modification of this invention is shown in FIGS. 4, 5 and 6, particularly in which the handle 11' also extends along a diameter of the fixed ring-like annular support of the inner channeled part 12' of the reel 16' but the handle end 25' of the fishing rod 10' is there shown as a separate part from that annular reel support 12' and its handle 11'. For the purpose of this modification the fixed handle 11' of the annular reel support is formed at its forward end with a cylindrical strap-like portion 26' through which the butt end of the rod handle 25' is slid and over the surface of the reel handle 11'. Adjacent the rear end of the handle 11' a forwardly open cylindrical socket member 27' is also formed in part with the handle 11' into which the butt end of the rod handle is finally seated and latched therein by the combined action of the upwardly arched spring leaf 28' and the coiled spring projected ball 29' in the body of the rod handle 25' into the keeper opening 29' in the fixed socket member 27'. Obviously, the fisherman will hold this combined structure of the rod and reel as one handle the same as he would the integral structure of FIG. 1 and the line spool 16' will revolve about the hand gripped handle 11' of the reel in giving improved action and control of the rod during all fishing operations as in FIG. 1. If further detailed information is needed regarding the construction and operation of the reel section 16 or the rod 10' of the instant application attention is invited to applicant's formerly issued Pats. 3,210,881 of Oct. 12, 1965 for the rod and 3,289,968 of Dec. 6, 1966 for the reel.

Having described the above noted invention shown by the drawings FIGS. 1 to 6, I wish it understood by those skilled in the art to which this invention relates, that other changes in construction and modifications may be made by those skilled in the art without departing from the spirit and scope of the invention, such as, for instance, by providing a hollow rod 10" which is rigid with a hollow handle 11" on a diameter of the circular reel support 12" for a spool 13", all as shown in FIG. 7. In this form of my invention the rigid line guide member 20" extends rearwardly from the hollow handle 11" and adjacent side of the circular spool support 12" from which it extends radially beyond the laterally spaced flanges 18" of the reel spool 13". The fishing line 30", therefore, must come off of the spool 13" to the rear of the handle member 11" and then make a reverse turn through the bent tubular "nylon" line guide eyelet 31" carried at the outer bent end of the rigid line guide member 20". From this guide eyelet 31" the line 30" enters an eyelet 32" at the rear end of the handle, from which it travels through the hollow rod 10" to and through the outer tip member 33". The spool 13" in FIG. 7 may be rotatively mounted on the radially reinforced annular fixed inner channeled support 12" by a steel ring lined antifriction structure, such as is shown at 8 and 9 in FIG. 2.

The disclosures and the description herein are purely illustrative and are not intended to be in any sense limiting.

I claim:

1. A combined fishing rod and reel comprising a handle, a reel surrounding the handle, and a rod secured to said handle and reel, said reel comprising a fixed annulus and a line spool rotationally mounted on the annulus, said handle being secured on a diameter of the annulus and having a portion in substantial alignment with said rod.

2. A device as defined in claim 1 wherein said rod is secured to the handle by being formed integrally therewith.

3. A device as defined in claim 1 wherein the rod is secured to the handle and reel by a strap secured to said reel adjacent one end of the handle, a socket secured to the reel at the opposite end of the handle, and means in the socket latching the butt end of the rod therein.

4. A device as defined in claim 1 wherein said rod is hollow, and means connected to said handle and reel for guiding a line from the spool through said rod.

References Cited

UNITED STATES PATENTS

| | | | |
|---|---|---|---|
| 1,452,808 | 4/1923 | Lee | 43—20 |
| 2,402,882 | 6/1946 | Garr | 43—20 |
| 2,535,404 | 12/1950 | Fry | 43—20 |
| 3,289,968 | 12/1966 | Wilson | 242—96 |

SAMUEL KOREN, Primary Examiner

D. J. LEACH, Assistant Examiner

U.S. Cl. X.R.

242—96; 43—23, 24